United States Patent [19]
Bourne et al.

[11] Patent Number: 5,542,260
[45] Date of Patent: Aug. 6, 1996

[54] NIGHT-STORAGE UNDERFLOOR COOLING SYSTEMS

[76] Inventors: Richard C. Bourne, 2379 Isle Royale La.; David A. Springer, 207 Cortez Ave., both of Davis, Calif. 95616

[21] Appl. No.: 298,660

[22] Filed: Aug. 31, 1994

[51] Int. Cl.⁶ .................................................. F25D 23/00
[52] U.S. Cl. ................ 62/171; 62/185; 62/259.4; 62/310; 165/49; 165/56
[58] Field of Search ............................. 62/171, 332, 201, 62/185, 259.1, 259.4, 175, 304, 310; 165/49, 56

[56] References Cited

U.S. PATENT DOCUMENTS

| | | | |
|---|---|---|---|
| 2,660,863 | 12/1953 | Gerhart. | |
| 3,200,606 | 8/1965 | Hewett et al. | 62/171 X |
| 3,276,516 | 10/1966 | Japhet | 62/185 X |
| 3,563,305 | 2/1971 | Hay | 165/2 |
| 3,957,109 | 5/1976 | Worthington | 165/48 |
| 3,994,278 | 11/1976 | Pittinger | 126/271 |
| 4,082,080 | 4/1978 | Pittinger | 126/271 |
| 4,227,566 | 10/1980 | Stilber | 165/1 |
| 4,237,965 | 12/1980 | Hay | 165/2 |
| 4,457,358 | 7/1984 | Kriege et al. | 62/185 X |
| 4,628,988 | 12/1986 | Yovanofski | 165/48.2 |
| 4,698,979 | 10/1987 | McGuigan | 62/171 |
| 5,174,128 | 12/1992 | Bourne et al. | 62/373 |

OTHER PUBLICATIONS

Paul Clegg, "Energy Pioneers," *The Sacramento Bee*, Mar. 6, 1994.

*Primary Examiner*—Harry B. Tanner
*Attorney, Agent, or Firm*—Oliff & Berridge

[57] ABSTRACT

An underfloor cooling system for cooling a building structure has tubing located in or under a massive floor of the structure for circulating water through the system. The water is directed through a cooling means connected to the tubing to cool the water. The cool water is then returned to the tubing to cool the massive floor and passively cool the structure. The cooling means may be a direct evaporative cooler or an evaporative radiative roof spray system. The cooling means may be located outdoors. The system may additionally include active cooling delivery such as at least one fan coil or at least one hydronic panel, through which cool water from the underfloor tubing is circulated to provide cool air to the structure.

35 Claims, 3 Drawing Sheets

NIGHT-STORAGE UNDERFLOOR COOLING SYSTEMS

BACKGROUND OF THE INVENTION

1. Field of the Invention

This invention relates to an energy saving cooling system for a building structure and in particular to such a cooling system that provides thermal storage and passive cooling through the floor of the structure.

2. Description of Related Art

An energy saving protected roof system is described in U.S. Pat. No. 5,174,128 to Bourne et al., which is herein incorporated by reference. The Bourne et al. system includes a waterproof membrane on a roof deck, a reservoir defined by the waterproof membrane containing a liquid, at least one insulating panel adapted to float on the reservoir and covering the waterproof membrane, pumping means having an inlet within the reservoir and an outlet communicating with the surrounding environment for selectively distributing liquid from the reservoir onto the external surface of the panel, drain means through the panel for permitting drainage of liquid in the external surface into the reservoir and overflow drainage means extending through the roof for establishing a desired depth of the reservoir. The Bourne et al. system reduces cooling costs on buildings through night evaporative and radiative cooling of the liquid reservoir by spraying the liquid at night on top of the insulation to cool the liquid. Significant radiative cooling occurs because the night sky is typically at least 30 degrees cooler than the night air in fairly dry areas such as the southwestern part of the United States. The cooled liquid drains through the drain means and returns to the water reservoir. During the day, the cooled water minimizes roof temperature variations and decreases heat transfer from the roof to the interior of the structure.

The roof-reservoir system requires significant modifications to conventional construction, since a "dead level" structure is necessary. Also, direct cooling of the structure through the roof is not efficient if the roof deck is not exposed to the interior of the structure, in which case the reservoir would not be in heat exchange relationship with the interior of the structure.

SUMMARY OF THE INVENTION

It is an object of the invention to provide an effective "night storage" system for cooling structures that does not require roof storage of a reservoir of water.

It is a further object of the present invention to provide such a cooling system that passively cools the structure through the floor. It is a further object of the present invention to provide such cooling system that provides both passive cooling and active cooling of the structure.

To achieve the above and other objects, this invention provides a cooling system for cooling a building structure, the system including:

tubing located under the floor of the structure for storing water, the tubing having a first end and a second end;
cooling means connected to the tubing for cooling the water;
a pump connected between the first end of the tubing and the cooling means for pumping and circulating the water through the cooling means;
a conduit between the cooling means and the second end of the tubing to return cooled water to the tubing to create a reservoir of cooled water within the tubing for passively cooling the structure; and
a controller for selectively activating the pump and the cooling means in response to time of day and weather conditions to cool the water and to circulate the cooled water continuously through the tubing to "store cooling" by removing heat energy from the massive floor.

The preferred cooling system in accordance with the present invention reduces cooling costs on commercial and residential buildings by cooling the water and massive floor structure, and passively cooling the building through the floor.

The invention also includes methods for actively cooling a building structure in accordance with the above described cooling system.

BRIEF DESCRIPTION OF THE DRAWINGS

These and other aspects and advantages will become apparent from the detailed description of preferred embodiments when taken in conjunction with the accompanying drawings in which like reference numerals represent like elements and wherein.

DETAILED DESCRIPTION OF PREFERRED EMBODIMENTS

Figure 1:
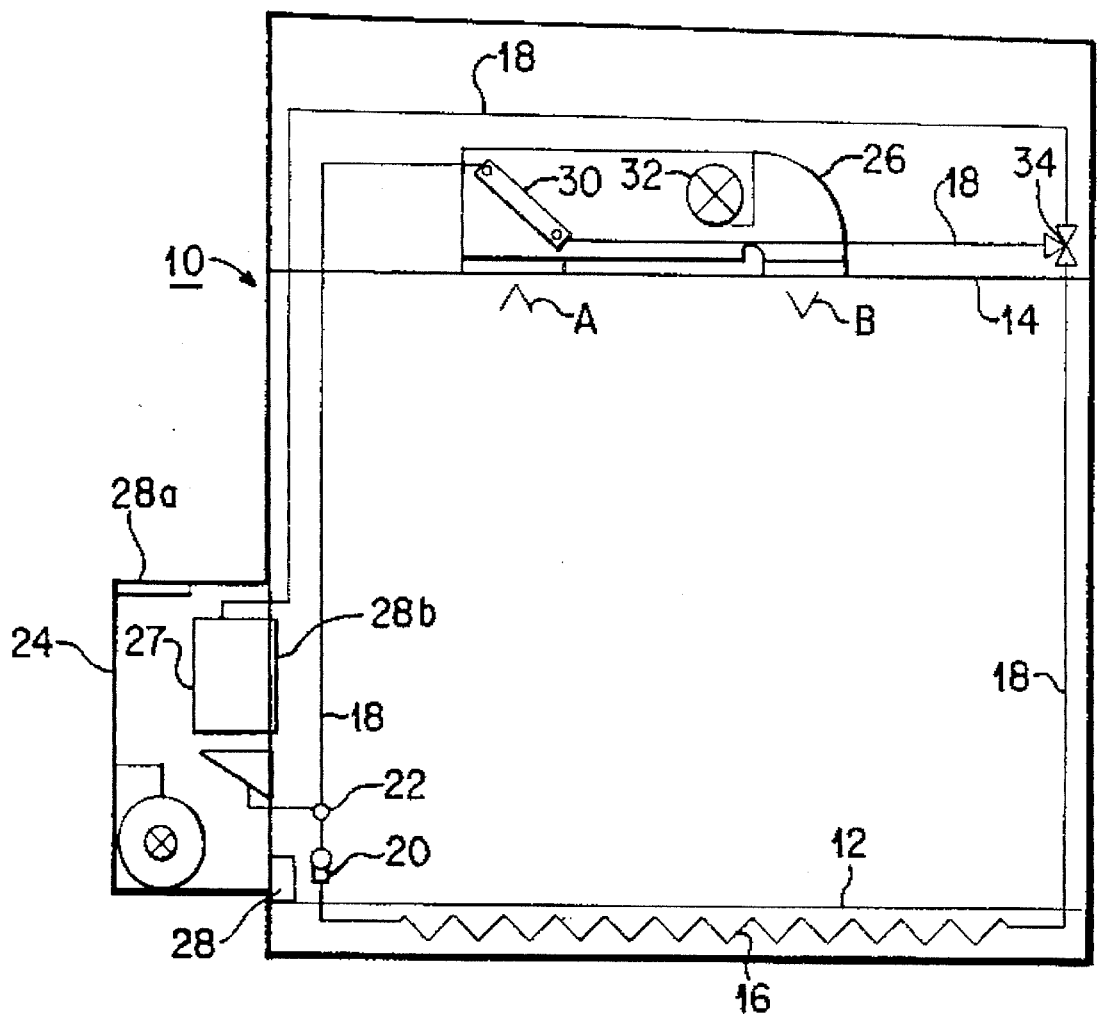
FIG. 1 is a schematic illustration of a building structure equipped with a preferred embodiment of the cooling system using a direct evaporative cooler in accordance with the claimed invention.
Figure 3:
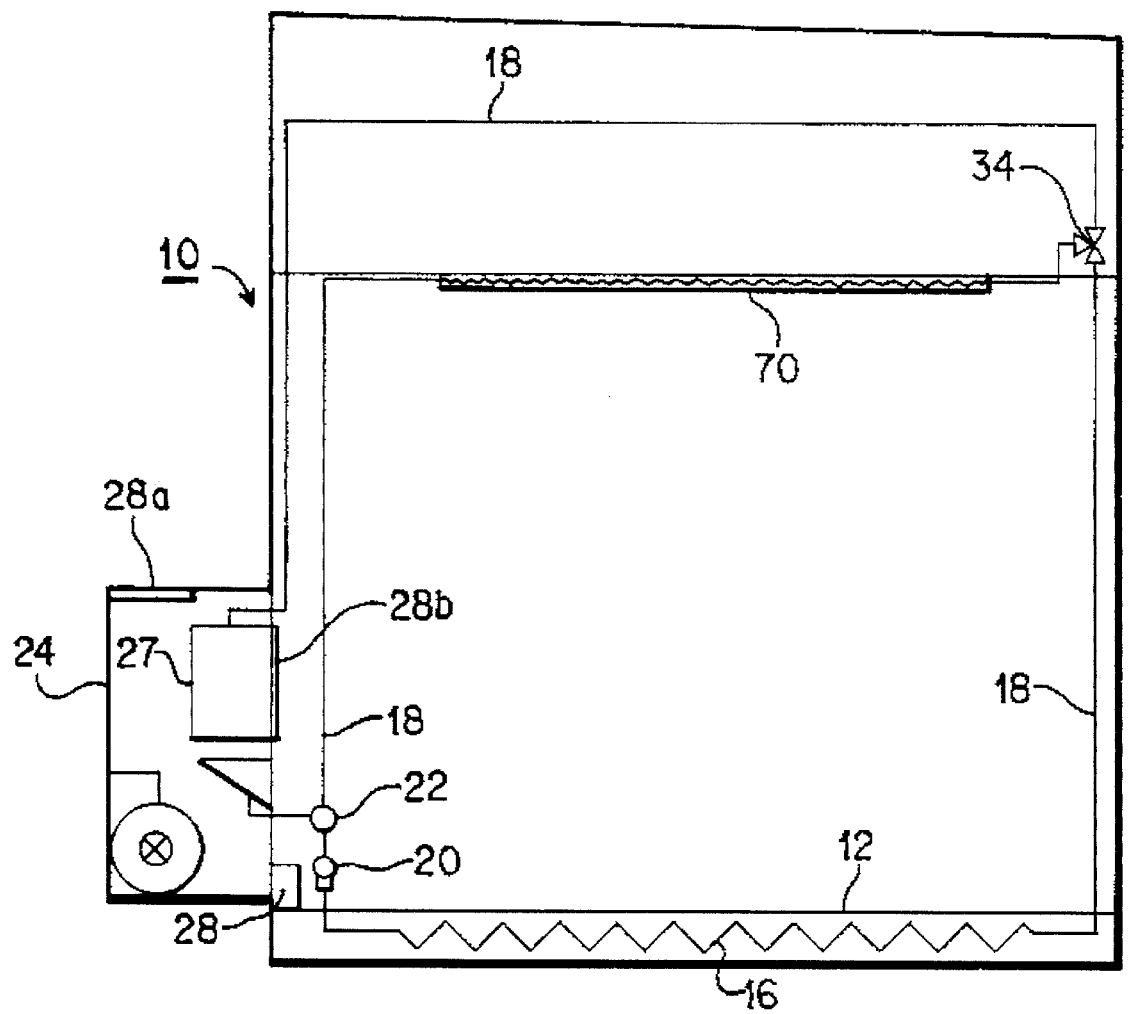
FIG. 3 is a schematic illustration of a building structure equipped with a preferred embodiment of the cooling system using a hydronic panel system in accordance with the claimed invention.

FIG. 1 is a schematic illustration of a structure 10 equipped with a preferred embodiment of the underfloor evaporative cooling system of the present invention. The structure 10 is equipped with tubing 16, which is located in or under a massive floor 12. The massive floor 12 may be a slab on grade construction floor or a concrete floor above grade. The tubing 16 contains water. The water is circulated by pump 20 from tubing 16 through pipes 18 disposed at various locations throughout the structure. The water follows one of two paths in accordance with the setting of a diverting valve 22. Diverting valve 22 directs the pumped water either through direct evaporative cooler 24 or through fan coil 26. The water is then returned to tubing 16. Alternatively, fan coil 26 may be replaced by a hydronic panel system 70 (see FIG. 3) to eliminate parasitic fan energy.

The various components of the cooling system are controlled by controller 28, which is connected to the various components of the system by wiring (not shown). The controller 28 attempts to maintain the slab at a programmed, variable target temperature by running the direct evaporative cooler 24 at favorable times (typically at night) to cool water circulated from the underfloor tubing 16 through direct evaporating cooler 24. Direct evaporative coolers are well known and commonly available, and can provide evaporative cooling to forced water and air streams. Such a direct evaporative cooler works by dripping the water into a pad or permeable medium such as pad 27 and blowing air having a wet bulb temperature lower than dry bulb outdoor air temperature across the pad to evaporatively cool the water and the air. The direct evaporative cooler 24 shown in FIG. 1 includes dampers 28a and 28b. Damper 28a is used to deliver exhaust air from direct evaporative cooler 24 to an area outside of structure 10. Damper 28b is used to direct evaporatively cooled air from direct evaporative cooler 24 to the inside of structure 10 in response to a signal from controller 28. Controller 28 may generate such a signal automatically in response to the setting of a thermostat (not shown) located within structure 10. Outlet dampers (not shown) or open windows allow exhaust air to leave the building structure 10.

When further cooling of structure 10 is required due to rising interior temperatures (usually during daylight hours), the controller 28 directs diverting valve 22 to direct water away from direct evaporative cooler 24 to an active cooling delivery system such as fan coil 26. Fan coil 26 includes a cooling coil 30 and a fan 32. Water flowing through cooling coil 30 lowers the temperature of the cooling coil 30. In response to a signal from controller 28, fan 32 is activated and directs air into fan coil 30 in a direction shown by arrow A and across cooling coil 30 to lower the air temperature of the air at the cooling coil 30. The air cooled by the cooling coil is then directed back into the living area of structure 10 in a direction shown by arrow B. When water is directed to the fan coil through diverting valve 22, three-way valve 34 is switched so that the water may return to underfloor tubing 16 through pipes 18. The massive floor 12 recools the circulating water while continuing to passively cool the interior of the structure 10.

The system of FIG. 1 is operated during hot weather months to cool the massive floor 12 through direct evaporative cooler 24 when wet bulb temperature is relatively low, typically at night. The massive floor 12 passively cools the interior of the structure. In addition, the cooled water may be circulated through one or more fan coils 26 or hydronic panels to provide active cooling of structure 10 as necessary. During cooler months, operation of the system is modified by the controller to run the direct evaporative cooler 24 for fewer hours to reduce energy consumption and prevent overcooling.

Figure 2:
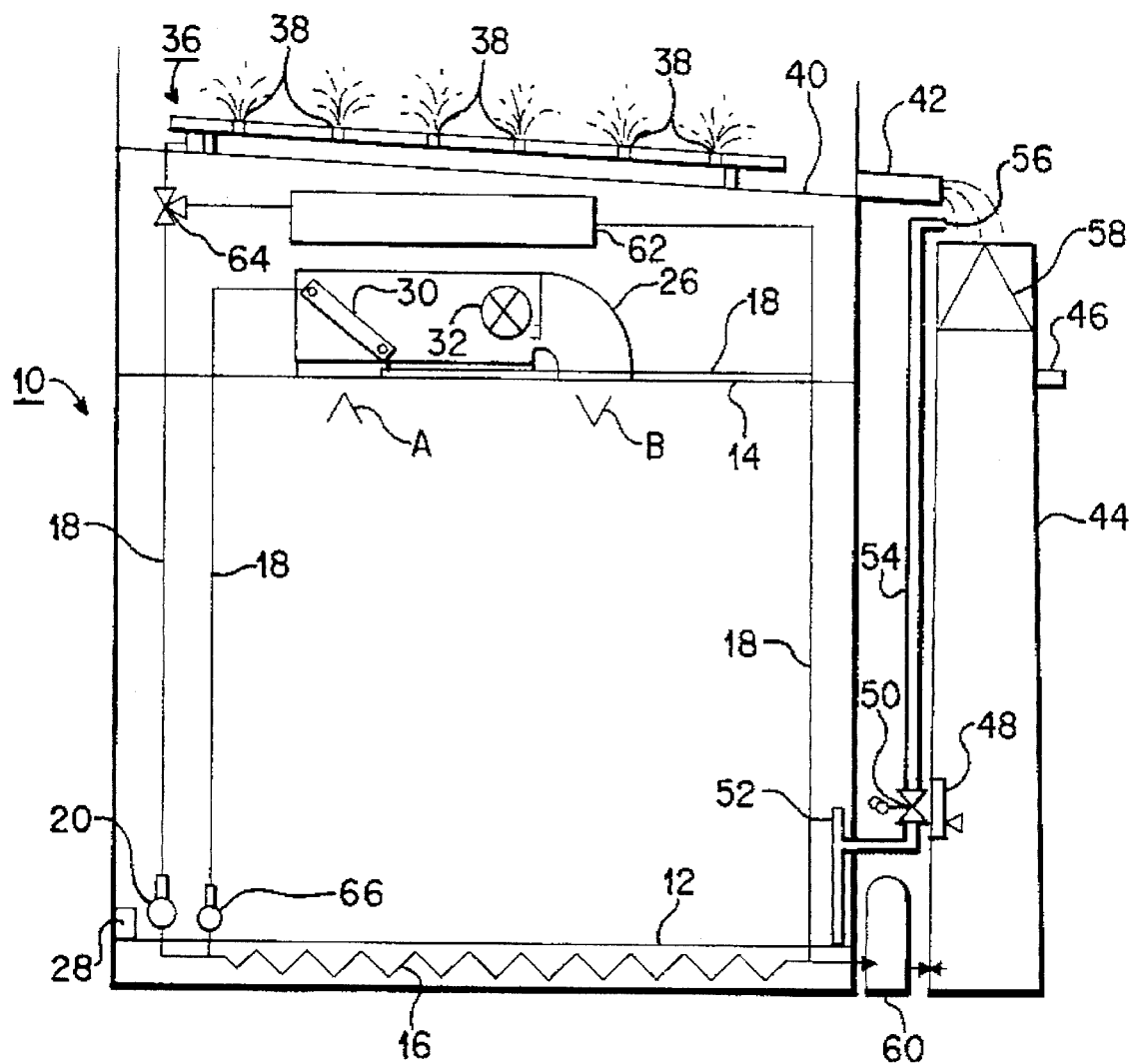
FIG. 2 is a schematic illustration of a building structure equipped with the cooling system using a roof spray system in accordance with a second preferred embodiment of the claimed invention.

FIG. 2 is a schematic illustration of a structure equipped with a second preferred embodiment of the present invention. As in FIG. 1, FIG. 2 shows tubing 16 placed in or under massive floor 12. The tubing 16 contains water. At direction from controller 28, pump 20 pumps water to roof spray system 36, which includes individual spray heads 38 located on a roof 40 of structure 10 to selectively spray water onto the external surface of the roof 40. Water from the roof spray system 36 is cooled by evaporation to the air and radiation to the cool sky. After landing on the surface of roof, the water flows to a scupper or drain 42 located at the low point of roof 40.

In the preferred embodiment shown in FIG. 2, water draining through scupper 42 flows into water buffer column 44. Water buffer column 44 has several features associated with control of the water level within water buffer column 44. Near the top of water buffer column 44 is an overflow pipe or spout 46 for draining off excess water during rainy conditions. At a lower portion within water buffer column 44 is a refill float sensor 48 which senses when the water within water buffer column 46 drops below a predetermined level. When the refill float sensor 48 senses a drop of water below the predetermined level within water buffer column 44, it causes solenoid valve 50 connected to pressurized domestic water supply system 52 to open. Water then flows through pipe 54 into water buffer column 44 through spout 56 located at an end of pipe 54 until the float sensor 48 indicates that refill has been achieved, causing solenoid valve 50 to close. Thus, the water within water buffer column 44 may be maintained within predetermined ranges corresponding to the height of spout 46 and refill float sensor 48 within the water buffer column 44.

In addition, the system has several features for preventing dirt or debris from entering the water within the building piping system. A screen 58 is attached to an upper end of water buffer column 44 to prevent debris from entering at the upper end of the water buffer column 44. In addition, a filter 60 is located between water buffer column 44 and tubing 16 to filter the water prior to its return from the water buffer column 44 to tubing 16.

The underfloor cooling system of the present invention may also be equipped with mechanical chillers for further storage cooling of the massive floor 12. In the preferred embodiment shown in FIG. 2, an auxiliary chiller 62 is shown which provides further cooling of the water flowing through it. Upon a signal from controller 28, diverting valve 64 diverts the flow of water from pump 20 away from roof spray system 36 and through auxiliary chiller 62. The water then returns to underfloor tubing 16 through pipes 18. In this preferred embodiment, an additional pump 66 is provided to direct water through fan coil 26. Fan coil 26 is used to provide active cooling of structure 10, as described herein in reference to FIG. 1. Again, a hydronic panel system, such as the hydronic panel system 70 shown in FIG. 3, may be used in place of fan coil units 26.

Cooling of the structure is enhanced in several ways. Cooling of the water in roof spray system 36 cools the surface of roof 40 which may be in heat exchange relationship with the interior of the structure. In hot weather, the roof spray system may typically operate from 10:00 p.m. to 7:00 a.m., providing effective evaporative and radiative cooling of the water. In cooler weather, the start of the roof spray system may be delayed so as to operate during the most favorable time periods for night cooling performance. The cool floor 12 delivers passive cooling to the interior of the structure. If additional cooling of the water within the system is required, controller 28 will activate pump 20 and diverting valve 64 to direct water through auxiliary chiller 62. If the interior of the structure requires active cooling, the fan coil 26 and pump 66 may be automatically controlled through thermostats located within structure 10. The system of FIG. 2 may be operated with any number of fan coils at various locations within structure 10. Additionally, the roof spray system may be activated for short periods of time during daylight hours to cool the surface of roof 40, reducing cooling loads on the building interior. The system of the present invention will eliminate or reduce the size of conventional cooling systems, depending on cooling loads.

While this invention has been described in conjunction with the specific embodiments thereof, it is evident that many alternatives, modifications and variations will be apparent to those skilled in the art. Accordingly, the preferred embodiments of this invention, as set forth herein, are intended to be illustrative and not limiting. Various changes may be made without departing from the spirit and scope of the invention as defined in the following claims.

What is claimed is:

1. A cooling system for cooling an interior of a building structure, the building structure having a massive floor and a roof, the system comprising:

tubing containing water, the tubing located in heat exchange relationship with the massive floor of the structure, the tubing having a first end and a second end;

cooling means for cooling the water, the cooling means connected to the tubing;

a pump connected between the first end of the tubing and the cooling means for pumping and circulating the water through the cooling system;

a conduit between the cooling means and the second end of the tubing to return cooled water to the tubing to cool the massive floor; and a controller for selectively activating the pump and the cooling means in response to time of day and temperature conditions to cool the water and store cooled water in the tubing to thereby vary an amount of heat removed from the massive floor.

2. The cooling system of claim 1, wherein the cooling means comprises a direct evaporative cooler.

3. The cooling system of claim 2, wherein the cooling means is located on an outside surface of the structure.

4. The cooling system of claim 3, wherein the direct evaporative cooler further comprises a damper selectively communicating with an inside of the structure for delivering evaporatively cooled air to an inside of the structure.

5. The cooling system of claim 1, wherein the cooling means comprises an evaporative cooler.

6. The cooling system, of claim 5, wherein the evaporative cooler is a direct evaporative cooler and the controller activates the evaporative cooler at night.

7. The cooling system of claim 1, further comprising:

at least one cooling delivery pump connected to the tubing for pumping a portion of the water; and water-to-air cooling delivery means for receiving the portion of the water and for cooling air inside the structure with the portion of the water.

8. The cooling system of claim 7, wherein the at least one cooling delivery pump is selectively activated by the controller in response to a temperature within the structure.

9. The cooling system of claim 7, wherein the water-to-air cooling delivery means comprises at least one fan coil.

10. The cooling system of claim 7, wherein the water-to-air cooling delivery means comprises at least one hydronic panel.

11. The cooling system of claim 1, further comprising:

a diverting valve connected between the pump and the tubing for selectively diverting the water away from the cooling means; and water-to-air cooling delivery means for receiving the water diverted away from the cooling means and for cooling air directed into the structure with the diverted water.

12. The cooling system of claim 11, wherein the water-to-air cooling delivery means comprises at least one fan coil.

13. The cooling system of claim 11, wherein the water-to-air cooling delivery means comprises at least one hydronic panel.

14. The cooling system of claim 1, further comprising:

a diverting valve disposed between the pump and the cooling means for selectively diverting the water away from the cooling means in response to a signal from the controller; and an auxiliary chiller connected between the diverting valve and the second end of the tubing for receiving and cooling the diverted water.

15. The cooling system of claim 1, wherein the cooling means comprises a spray system located on the roof, the spray system comprising:

a plurality of spray heads disposed on the roof of the structure for selectively spraying the water onto an external surface of the roof; and a drain located at a lower point of the roof for draining the water on the external surface of the roof and directing the water to the second end of the tubing.

16. The cooling system of claim 15, further comprising a water containment vessel disposed between the drain and the second end of the tubing receiving the water from the drain and directing the water to the tubing.

17. The cooling system of claim 16, further comprising a screen located between the drain and the water containment vessel to prevent entry of debris into the water containment vessel.

18. The cooling system of claim 16, wherein the water containment vessel further comprises overflow drainage means for draining the water in the water containment vessel which rises above a predetermined level.

19. The cooling system of claim 16, further comprising:

a refill float sensor located at a predetermined height within the water containment vessel for sensing when the water in the water containment vessel drops below the predetermined height;

a refill pipe connected to a water supply and the water containment vessel; and an automatic valve located in the refill pipe and connected to the refill float sensor, the valve opening when the refill float sensor senses that the water is below the predetermined height causing a predetermined amount of water to enter the water containment vessel from the refill pipe.

20. The cooling system of claim 16, further comprising a water filter located between the drain and the second end of the tubing.

21. A cooling system for cooling a building structure, the building structure having a massive floor and a roof, the system comprising:

tubing containing water, the tubing located in or under the massive floor of the structure, the tubing having a first end and a second end;

a direct evaporative cooler connected to the tubing for cooling the water;

a pump connected between the first end of the tubing and the direct evaporative cooler for pumping and circulating the water through the tubing and the direct evaporative cooler;

a diverting valve connected between the pump and the tubing for selectively diverting the water away from the direct evaporative cooler; and water-to-air cooling delivery means for receiving the water diverted away from the direct water evaporative cooler and for cooling air inside the structure with the diverted water; and a controller for selectively activating the pump, the diverting valve and the direct evaporative cooler in response to time of day and temperature conditions to cool the water and to vary an amount of heat removed from the massive floor.

22. The cooling system of claim 21, wherein the water-to-air cooling delivery means comprises at least one fan coil.

23. The cooling system of claim 21, wherein the water-to-air cooling delivery means comprises at least one hydronic panel.

24. A method of cooling a building structure, the building structure having a roof, a massive floor and tubing in or under the massive floor, the method comprising the steps of:

selectively directing the water from the tubing to a cooling means in response to time of day and temperature conditions;

cooling the water with the cooling means; and directing the cooled water through the massive floor to vary an amount of heat removed from the massive floor; and passively cooling the building structure by natural heat transfer from the building to the cool floor.

25. The method of claim 24, wherein the cooling means comprises a direct evaporative cooler.

26. The method of claim 25, wherein the direct evaporative cooler is located on an outside wall of the structure and includes a damper communicating with an inside of the structure, further comprising the step of delivering air from an outside of the structure cooled by the direct evaporative cooler to an inside of the structure.

27. The method of claim 24, further comprising the steps of:

selectively circulating the water from the cool floor to at least one water-to-air cooling delivery device in response to a temperature within the structure;

cooling air from inside the structure with the water-to-air cooling delivery device; and directing the air cooled by the water-to-air cooling delivery device into the structure.

28. The method of claim 24, further comprising the steps of:

selectively diverting the water away from the cooling means to at least one water-to-air cooling delivery device in response to time of day and a temperature inside the structure;

cooling air from inside the structure with the water-to-air cooling delivery device; and directing air cooled by the water-to-air cooling delivery device into the structure.

29. The method of claim 24, further comprising the steps of:

selectively diverting the water away from the cooling means in response to time of day, weather and floor temperature conditions;

directing the diverted water to an auxiliary chiller located between the diverting valve and the tubing; and cooling the diverted water with the auxiliary chiller.

30. The method of claim 24, wherein the cooling means comprises a spray system located on the roof, further comprising the steps of:

selectively spraying the water onto an external surface of the roof in response to time of day and weather conditions to evaporatively and radiatively cool the water;

draining the water from the external surface of the roof through a drain located at a low point of the roof; and directing the water from the drain to the second end of the tubing.

31. The method of claim 30, further comprising the step of directing the water from the drain to a water containment vessel disposed between the drain and the second end of the tubing.

32. The method of claim 31, further comprising the step of screening the water entering the water containment vessel preventing entry of debris into the water containment vessel.

33. The method of claim 31, further comprising the step of draining the water which rises above a predetermined level in the water containment vessel.

34. The method of claim 31, further comprising the steps of:

sensing when the water in the water containment vessel drops below a predetermined height with a refill float sensor;

opening an automatic valve located in a refill pipe and connected to the refill float sensor to add a predetermined amount of water to the water containment vessel from the refill pipe.

35. The method of claim 31, further comprising the step of filtering the water moving from the water containment vessel to the tubing.

* * * * *